United States Patent [19]
Edele et al.

[11] Patent Number: 5,894,626
[45] Date of Patent: *Apr. 20, 1999

[54] WIPER ARM, ESPECIALLY FOR MOTOR VEHICLES

[75] Inventors: Reinhard Edele; Oldrich Krizek, both of Bietigheim-Bissingen, Germany

[73] Assignee: ITT Automotive Europe GmbH, Frankfurt am Main, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/727,583
[22] PCT Filed: Apr. 26, 1995
[86] PCT No.: PCT/EP95/01589
  § 371 Date: Oct. 28, 1996
  § 102(e) Date: Oct. 28, 1996
[87] PCT Pub. No.: WO95/29827
  PCT Pub. Date: Nov. 9, 1995

[30] Foreign Application Priority Data

Apr. 29, 1994 [DE] Germany .............. 44 15 081

[51] Int. Cl.⁶ .................. B60S 1/46; B60S 1/52
[52] U.S. Cl. .................. 15/250.04; 239/284.1
[58] Field of Search ............ 15/250.04, 250.02, 15/250.01, 250.351, 250.201, 250.32; 237/284.1; 138/106, 107

[56] References Cited

U.S. PATENT DOCUMENTS 3,827,101  8/1974  Wubbe ................... 15/250.04

FOREIGN PATENT DOCUMENTS

| | | |
|---|---|---|
| 532417 | 3/1993 | European Pat. Off. . |
| 566470 | 10/1993 | European Pat. Off. ............ 15/250.04 |
| 2379411 | 9/1978 | France ................... 15/250.04 |
| 2547548 | 12/1984 | France ................... 15/250.04 |
| 2600026 | 12/1987 | France ................... 15/250.04 |
| 2337774 | 3/1974 | Germany ................ 15/250.04 |
| 2942086 | 4/1981 | Germany . |
| 3004478 | 8/1981 | Germany ................ 15/250.04 |
| 3639537 | 6/1988 | Germany ................ 15/250.351 |
| 2047079 | 11/1980 | United Kingdom ........... 15/250.04 |

*Primary Examiner*—Gary K. Graham
*Attorney, Agent, or Firm*—Arthur L. Plevy

[57] ABSTRACT

A wiper arm, especially for motor vehicles, with a wiper rod and a unit having a jacket and a hose to supply a washing nozzle with washing solution to wiper rod. The single piece, flexible material unit securely holds the hose to the wiper rod therein reducing installation cost. A wall of the unit is made divided, and opposing portions of wall are designed as a closure.

14 Claims, 3 Drawing Sheets

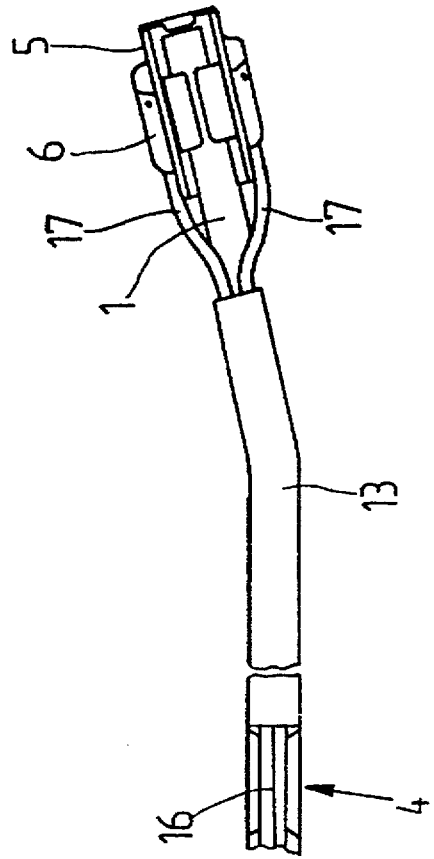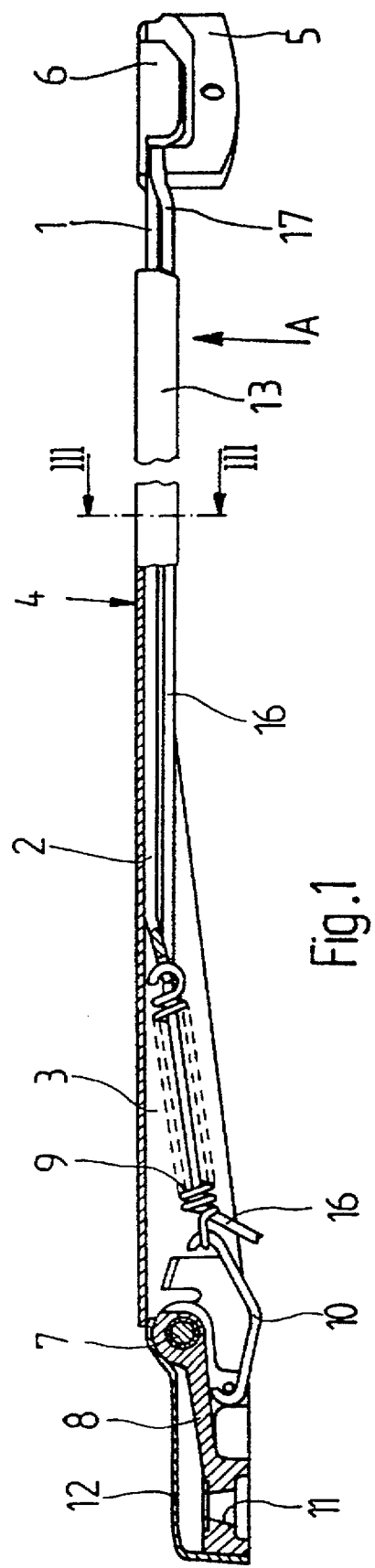
Fig. 2
Fig. 1

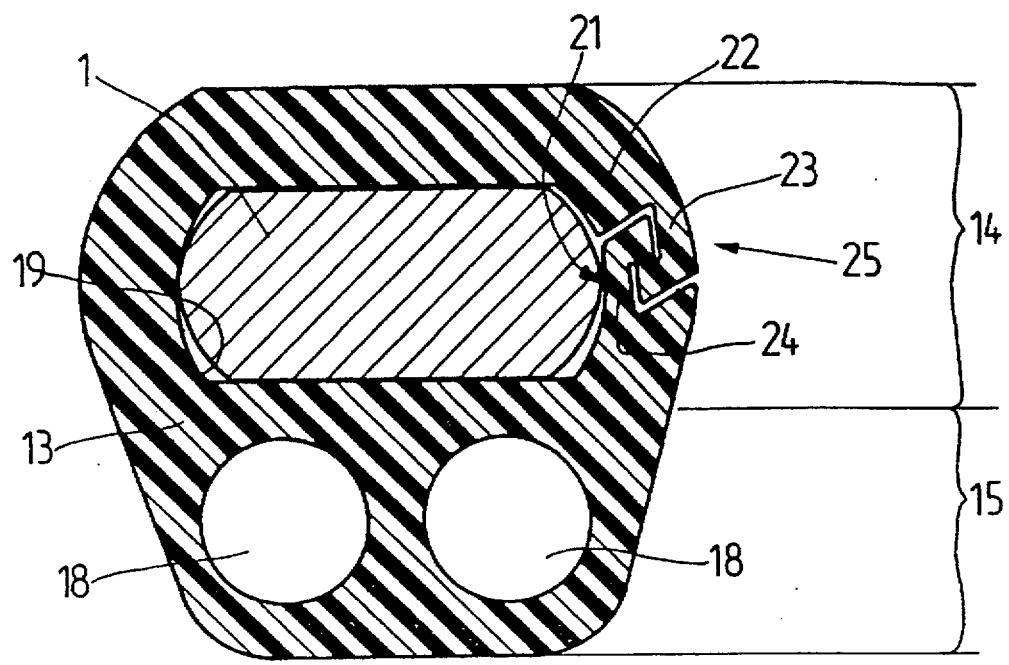
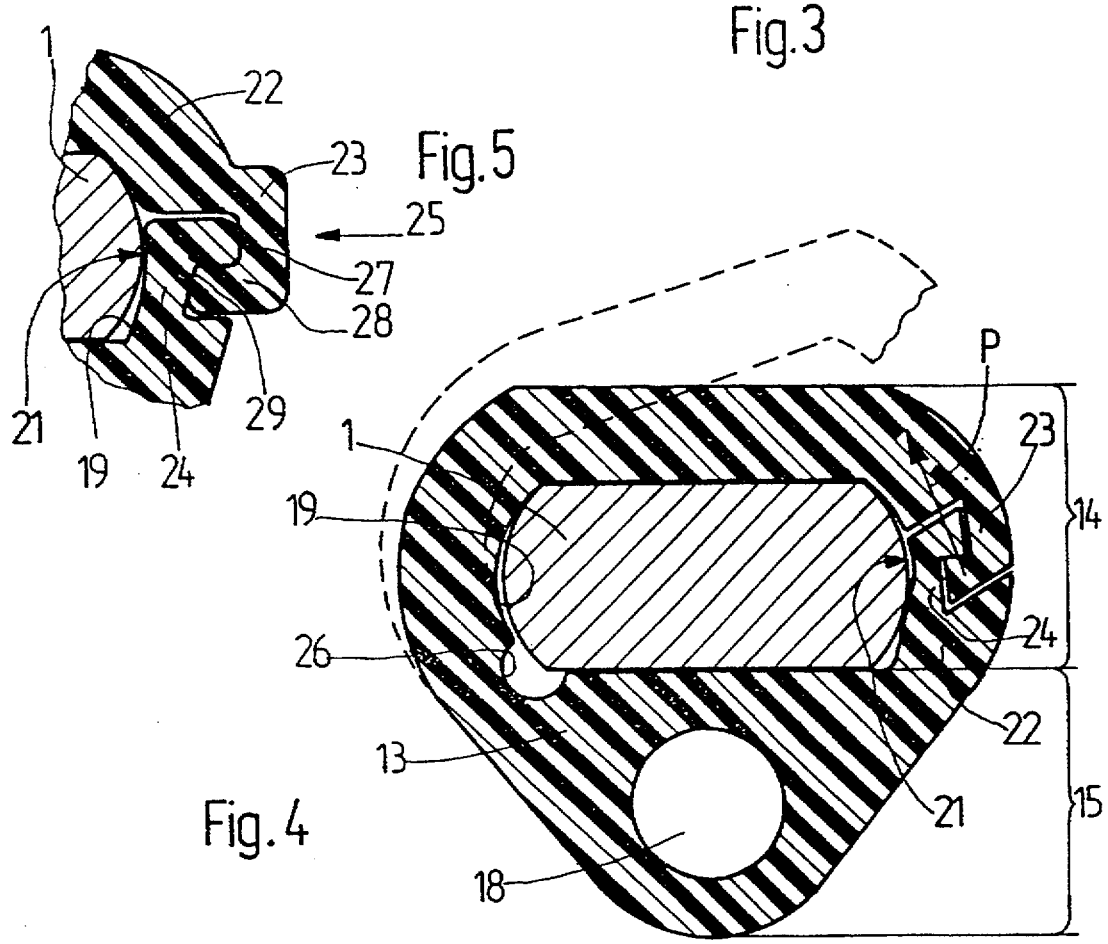

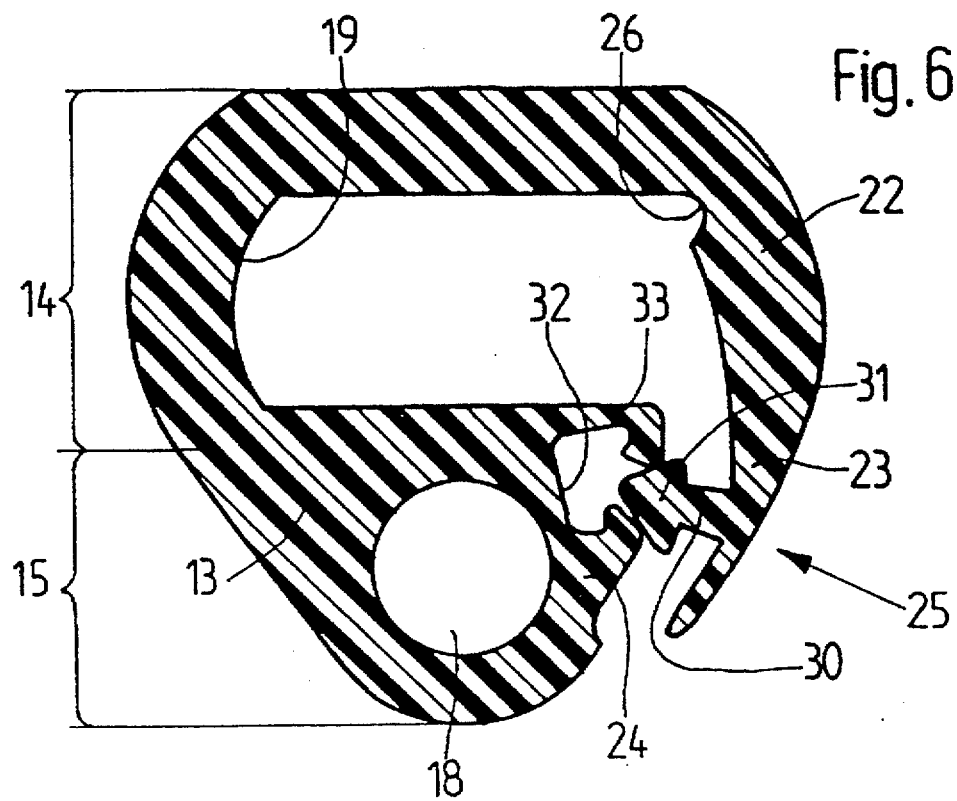
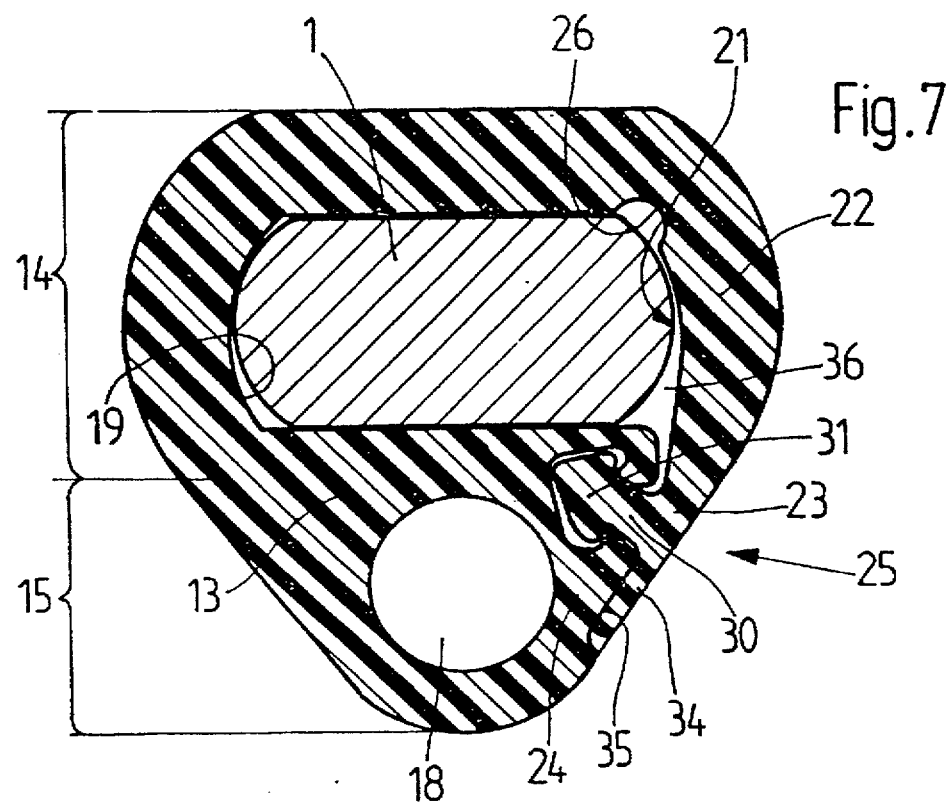

1

WIPER ARM, ESPECIALLY FOR MOTOR VEHICLES

FIELD OF THE INVENTION

The invention relates to a wiper arm, especially for motor vehicles, and more particularly to a wiper arm and a unit for surrounding a major portion of the wiper arm and having a hose for supplying a washing nozzle with washing solution.

BACKGROUND OF THE INVENTION

It is well known to have a wiper arm having a wiper rod, to whose free end a wiper blade is fastened. A jacket made of hard plastic is molded onto the open portion of the wiper rod; on the windshield side, said jacket has a one-piece molded-on open hose channel that is formed by walls and a hose channel floor. The walls of the hose channel are provided at least in some segments with an undercut to hold the hose. Such a wiper arm is described in DE-OS 41 17 106.

A disadvantage to this wiper arm is that the jacket is first molded onto the wiper rod and then the hose is inserted as a separate component into the hose channel of the jacket and must be locked. This means added installation expense.

In addition, if the wiper rod is designed in a curved manner, the walls of the hose channel must be provided with an undercut to hold the hose only in the straight areas. In the curved areas, the hose can protrude from the hose channel because of the inner stresses that arise.

It is desired to reduce the installation expense for a wiper arm with a wiper rod jacket and a hose for the washing solution line and in holding the hose securely on the wiper rod.

SUMMARY OF THE INVENTION

This present invention provides that the open portion of the wiper rod of the wiper arm over at least a majority of its length has a jacket and a hose to supply the washing nozzle on the wiper arm with washing solution, whereby said jacket is manufactured in one piece as a unit made of flexible material. This unit, which consists of a jacket for the wiper rod and solution hose, has a channel for accommodating the wiper rod, whereby the cross-section of this channel is matched at least approximately to the cross-section of the wiper rod. In addition, this unit has one or more solution channels with a preferably round cross-section. The solution channels and the channel for accommodating the wiper rod are separated from one another by corresponding partitions.

To be able to mount the unit on the open portion of the wiper rod in as simple a manner as possible, one wall of the channel is divided to accommodate the wiper rod over the entire length of the unit. The portions of the divided wall that face one another are designed as a closure.

When it is installed on the wiper rod, the unit that consists of a jacket and a hose is extremely simple to handle since this is only a single component. The divided wall of the unit is opened out against elastic prestressing to the extent that the unit can be pushed onto the wiper rod crosswise to its longitudinal extension. Because of the flexible material used, this opening out and pushing open of the unit on the wiper rod can also be progressively accomplished locally in the longitudinal direction, whereby the unit can also advantageously follow bends in the wiper rod without forming folds in the curved areas. After the closure is closed, which also can be done continuously locally in the longitudinal direction, the unit is held securely on the wiper rod and forms a jacket for the wiper rod that is both protective and aesthetically pleasing.

In each case, one end of a solution channel is to be connected by a connecting hose and a connecting support to a washing nozzle or by a connecting line to the washing nozzle. The agents and measures that are necessary in this connection are sufficiently well known and do not require explanation in any greater detail.

It is advantageous if, for example, the unit that consists of the jacket and the hose is configured as a compact component with an aerodynamically and/or aesthetically advantageous shape, mainly relative to the cross-sectional shape, and extends as much as possible over the entire length of the open wiper rod. An aerodynamically and/or aesthetically advantageous shape is achieved by outside surfaces which are as smooth as possible and not cleaved. The outer surface arranged inclined corresponding to the flow conditions, and has smooth transitions from one outside surface to the next.

In a preferred embodiment where the wiper arm has a wiper rod that is approximately rectangular in cross-section, the closure of the channel, which accommodates the wiper rod, extends along a narrow side of the wiper rod. This has the advantage that, when the wiper arm is in the parked position, the closure can be arranged on the underside and thus is not directly in the field of vision of an observer.

As a quite simple and effective type of closure, a desirable design includes the ends of the opposing portions of the wall that are divided lengthwise have cross-sectional shapes that are matched to one another and are to engage mutually. The frictional connection that is to be achieved between the portions of the divided wall ensures, in the case of relatively straight wall rods, a sufficiently secure closure of the channel, which accommodates the wiper rod.

In the case of a wiper arm with a curved wiper rod, stress states are produced at certain areas of the unit consisting of the jacket and the hose, which make it necessary to have a more secure closure of the channel. This can be achieved as shown in a preferred embodiment with a locking strip which is molded onto one portion of the divided wall, preferably over its entire length, and a corresponding locking groove is molded onto the other portion of the divided wall. In this case, the actual locking strip is advantageously manufactured from a narrow web which is set at some distance from the portion of the divided wall, molded onto the latter in one piece or with the entire unit in one piece. In this case, the locking strip and the locking groove should preferably have a heart-like cross-sectional shape. This cross-sectional shape makes it possible, on the one hand, to ensure a simple engagement of the locking web with the cross-section tip in front. On the other hand, a sufficiently secure closure is also ensured under stress conditions.

It can be advantageous in some of the preferred embodiments to have at least one of the two portions of the divided wall prestressed in the direction of the mutual engagement of the cross-sectional shapes that form the closure. This enhances the reliability of the frictional connection of the two portions of the divided wall. To further improve the mobility of at least one portion of a wall for opening the wall for the purpose of installing the unit on the wiper rod, the cross-section of the wall be reduced locally by at least one groove or slot that runs in the unit's lengthwise direction. This effect can also be enhanced if several such grooves or slots are offset relative to one another or are inserted into the wall directly opposite one another.

A preferred method of manufacturing of the unit, and one which is especially economical, is by extrusion. The units can be cut to the lengths that are necessary or desired in each case and then mounted on the wiper rod.

3

Further objects, features, and advantages of the present invention will become more apparent to those skilled in the art as the nature of the invention is better understood from the accompanying drawings and detailed descriptions.

BRIEF DESCRIPTION OF THE DRAWINGS

For the purpose of illustrating the invention, there is shown in the drawings forms which are presently preferred; it being understood, however, that this invention is not limited to the precise arrangements and instrumentalities shown.

FIG. 1 shows a wiper arm for a motor vehicle according to the invention (sectional representation);

FIG. 2 shows the front portion of the wiper arm as a view in the direction of arrow A in FIG. 1;

FIG. 3 shows cross-section III—III through the wiper arm in FIG. 1 according to the invention;

FIG. 4 shows a cross-section through another wiper arm according to the invention in the area of the wiper rod;

FIG. 5 shows a cutaway portion of the cross-section of another wiper arm according to the invention in the area of the wiper rod;

FIG. 6 shows a cross-section of a unit consisting of a jacket and hose with an open closure; and FIG. 7 shows a cross-section through a wiper arm according to the invention with a mounted unit according to FIG. 6 in cross-section.

DETAILED DESCRIPTION OF THE PREFERRED EMBODIMENTS

Referring now to the drawings, wherein like numerals indicate like elements, there is shown in FIG. 1 a wiper arm in accordance with the present invention. The motor-vehicle wiper arm that is shown in FIG. 1 has a wiper rod 1 which is approximately rectangular in cross-section, consists of spring band steel, and is arranged with its end 2 inside a hinge part 3 that is essentially unshaped in cross-section and is fastened to this hinge part. To secure wiper rod 1, the walls of hinge part 3 are crimped in front area 4 on wiper rod 1. On the free end of wiper rod 1, a connecting piece 5 is fastened to link a wiper blade, not shown, which is equipped with a multiple-nozzle washing nozzle body 6. Hinge part 3 is connected via an axis of rotation 7 to a fastening part 8 in a pivoting manner, and a clamping spring 9 that is arranged in a free space of the hinge part is connected at one end to end 2 of wiper rod 1 and at its other end via a c-shaped hook 10 to fastening part 8. The clamping spring 9 presses the wiper strip onto the vehicle windshield that is to be cleaned. Fastening part 8 has a conical opening 11 for fastening the wiper arm to a drive shaft, not shown. Finally, fastening part 8 is encased by a cover 12 that can pivot around axis of rotation 7.

As FIG. 2 in particular also shows, a unit 13 that consists of a jacket 14 for wiper rod 1 and a hose 15 to carry washing solution is mounted on the portion of wiper rod 1 that is outside hinge part 3. This unit 13 extends over most of the length of wiper rod 1 between hinge part 3 and connecting piece 5, whereby it is connected directly to the front end of hinge part 3.

In addition, FIGS. 1 and 2 show that a feed hose 16 with two channels, which is placed on the underside of hinge part 3 and wiper rod 1 that is in hinge part 3, is connected to unit 13. By means of two correspondingly shaped connecting tubes 17, washing nozzle body 6 is connected directly to the front end of unit 13. If these connecting tubes 17 are one-piece components of washing nozzle body 6, the connection of washing nozzle body 6 to unit 13 is simplified. Since unit 13 is designed as two solution channels 18 and feed hose 16 is designed as a double hose and washing nozzle body 6 is divided lengthwise and has a separate connecting tube 17 for each portion, it is possible to feed always only one solution channel 18 in a correspondingly controlled manner and as a result to spray the vehicle windshield in front of the wiper blade only in the direction of movement of the wiper blade.

The cross-section, shown in FIG. 3, along line III—III in FIG. 1 is shown in enlarged form, so that details of unit 13 are more evident. Unit 13 is manufactured in one piece from flexible, rubberlike plastic and contains a channel 19 for accommodating wiper rod 1, as well as two solution channels 18. Since wiper arms for motor vehicles are now preferably colored matt black, unit 13 is, of course, also colored black.

Right narrow side 21 of wiper rod 1 in FIG. 3 points downward if the wiper on the vehicle is at the lower edge of the windshield in the parked position. Wall 22 of unit 13 on this narrow side 21 is divided in the lengthwise direction of wiper rod 1 or unit 13, and opposing portions 23, 24 of wall 22 form a closure 25. For this purpose, portions 23 and 24 of wall 22 are equipped with mirror-image, hook-shaped cross-sectional shapes, which engage with one another by friction. In addition, FIG. 3 shows that unit 13 is a compact, simple-to-handle component which has smooth and mating outside surfaces, by which it can produce aerodynamically and aesthetically advantageous effects. Closure 25 is incorporated smoothly into the cross-sectional shape of unit 13, so that there are no disruptive effects.

Referring to FIG. 4, a view similar to FIG. 3 of an alternative embodiment is shown. It is distinguished in that unit 13 has only one solution channel 18, thus ensuring that the cross-section of unit 13 continuously tapers downward in FIG. 4. The outer sides of unit 13 are more steeply inclined toward one another. The shape of the cross-section of unit 13 in the case of open closure 25 is indicated by dotted lines. This shape corresponds to that in which unit 13 is produced by extrusion. Thus, upper portion 23 relative to lower portion 24 of wall 22 is subjected to prestressing in the direction of arrow P, which ensures a secure frictional connection of portions 23 and 24. To improve the elasticity and the mobility of the upper portion of unit 13 for its installation on wiper rod 1, a slot 26 in the wall of unit 13, which reduces the wall thickness in this area, is made on the left upper inside edge of channel 19.

FIG. 5 shows an alternative option for the design of closure 25. Portion 23 of wall 22 is made u-shaped in cross-section, whereby the opening of the u-shaped cross-section faces toward narrow side 21 of wiper rod 1. In the area of connecting web 27 of the u-shaped cross-section, portion 23 of wall 22 projects outward. Free leg 28 of the u-shaped cross-section hooks into a groove 29 in lower portion 24 of wall 22 and thus forms the frictional connection, which forms closure 25.

In FIG. 6, another embodiment of a unit 13 that is produced by extrusion is depicted in the open position of divided wall 22. This embodiment has only one solution channel 18 and is shaped approximately like unit 13 in FIG. 4. A locking strip 31 that is approximately heart-shaped in cross-section is molded on in one piece to portion 23 of wall 22 via a narrow web 30. Locking strip 31 is placed, with its tip out in front, on the open side of a corresponding locking groove 32, which is also approximately heart-shaped in cross-section and is inserted into portion 24. This corresponds to the position when locking web 31 begins to press into locking groove 32 to close channel 19. When locking groove 31 is pressed into or out of locking groove 32, the opening of locking groove 32 must be spread out. This is essentially ensured by elastic web 33 on the top side of locking groove 32. A slot 26 is provided in turn on the right upper inside edge of channel 19 to improve the mobility of wall 22. In the closed position of closure 25, tab-like projection 34 of portion 23 is recessed in a corresponding recess 35 in portion 24, so that the outer sides of closure 25 are aligned with one another. The type of locking closure 25 that is shown here is simple to handle, on the one hand, and is more reliable as regards unintentional or automatic opening in the case of existing inner stress conditions, on the other hand. This embodiment of unit 13 is therefore better suited to curved wiper rods.

In FIG. 7, unit 13 from FIG. 6 is shown mounted on a wiper-rod (1), whereby the description of FIG. 6 also essentially remains applicable. In addition, a free space 36 between wiper rod 1 and the inside of channel 19 can be seen, which allows web 33 to be deflected to open the catch connection and thus closure 25.

The present invention may be embodied in other specific forms without departing from the spirit or essential attributes therefore and, accordingly, references should be made to appended claims, rather than to the foregoing specification, as indicating the scope of the invention.

We claim:

1. A wiper arm comprising;

a wiper rod having a free end adapted to pivotably receive a wiper blade; and a unitarily formed elongated flexible jacket having a channel with a corresponding transverse cross-section for accommodating and surrounding the wiper rod, said unitarily formed jacket further comprising at least one solution channel for supplying a washing nozzle carried by the wiper rod with a washer solution, said at least one solution channel disposed beneath a bottom wall of said channel, wherein substantially planar and oppositely disposed top and bottom walls, and substantially curved side walls, coupled to said top and bottom walls define said channel, at least one of said side walls having a cavity extending at an intersection of said one of said side walls and said top or bottom wall for increased flexibility;

wherein one of said side walls of said channel is divided over the entire length of the jacket into two wall sections which can be separated to allow the wiper rod to be removed from and inserted into the channel, wherein the wall sections have opposing portions for engaging each other as a closure.

2. A wiper arm according to claim 1, wherein the jacket is configured as a compact component with an aerodynamically advantageous shape.

3. A wiper arm according to claim 1, wherein the wiper rod has a narrow side and the closure is on the side wall of the channel adapted to be in proximity to the narrow side of the wiper rod.

4. A wiper arm according to claim 3, wherein the opposing portions of the divided wall are complementary cross-sectional shapes forming the closure for mutual engagement.

5. A wiper arm according to claim 4, wherein the closure is formed from a locking strip that is molded onto one portion of the divided wall and a corresponding locking groove that is molded into the other portion of the divided wall, and the cross-sections of locking strip and locking groove have a corresponding first channel portion of a first width, and a second head portion, said head portion comprising a tapered top segment of width less than said first channel portion, and which integrally extends to a base segment of width greater than said first channel portion, wherein said base segment is coupled between said tapered top segment and said first channel portion.

6. A wiper arm according to claim 4, wherein at least one of two portions of the divided wall is prestressed in the direction of the mutual engagement of the cross-sectional shape that forms the closure.

7. A wiper arm according to claim 1, wherein one of the wall sections of the channel has a groove that runs in a longitudinal direction of the jacket.

8. A wiper arm according to claim 1, wherein the jacket is extruded.

9. A wiper arm comprising:

a wiper rod having a free and adapted to pivotably receive a wiper blade; and an elongated jacket formed from a one-piece flexible material, the jacket having a channel with a corresponding transverse cross-section for accommodating and surrounding the wiper rod for at least a majority of the wiper rod's length, and at least one solution channel for supplying a washing nozzle carried by the wiper rod with a washing solution;

wherein the jacket defines an outer wall that is divided over the entire length of the jacket into two wall sections which can be separated to allow the wiper rod to be removed from and inserted into the channel, the wall sections having opposing portions for engaging each other as a closure;

wherein the closure is formed from a locking strip that is molded onto one portion of the divided wall and a corresponding locking groove that is molded into the other portion of the divided wall, and the cross-sections of the locking strip and the locking groove have a corresponding first channel portion of a first width, and a second head portion, said head portion comprising a tapered top segment of width less than said first channel portion, and which integrally extends to a base segment of width greater than said first channel portion, wherein said base segment is coupled between said tapered top segment and said first channel portion.

10. A wiper arm according to claim 9, further comprising a connecting piece carried by the free end of the wiper rod and adapted to receive the wiper blade.

11. A wiper arm according to claim 9, wherein the wiper rod has a narrow side and the opposite portions of the divided wall are on a wall of the channel adapted to be in proximity to the narrow side of the wiper and the complementary cross-sectional shapes form the closure for mutual engagement.

12. A wiper arm according to claim 11, wherein at least one of two portions of the divided wall is prestressed in the direction of the mutual engagement of the cross-sectional shape that forms the closure.

13. A wiper arm according to claim 12, wherein one of the complimentary cross-sectional shapes of the opposite portions has a groove that runs in the longitudinal direction of jacket.

14. A wiper arm according to claim 13, wherein the unit is extruded.

* * * * *